United States Patent
Wu et al.

(10) Patent No.: US 11,956,492 B2
(45) Date of Patent: Apr. 9, 2024

(54) MEDIA STREAM PLAYING METHOD AND APPARATUS

(71) Applicant: Huawei Technologies Co., Ltd., Shenzhen (CN)

(72) Inventors: Qian Wu, Beijing (CN); Xiao Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/147,409

(22) Filed: Dec. 28, 2022

(65) Prior Publication Data

US 2023/0138838 A1    May 4, 2023

Related U.S. Application Data

(63) Continuation of application No. PCT/CN2020/099472, filed on Jun. 30, 2020.

(51) Int. Cl.
| | | |
|---|---|---|
| *H04N 21/414* | (2011.01) | |
| *H04N 21/442* | (2011.01) | |
| *H04N 21/8547* | (2011.01) | |

(52) U.S. Cl.
CPC . *H04N 21/41422* (2013.01); *H04N 21/44218* (2013.01); *H04N 21/8547* (2013.01)

(58) Field of Classification Search
CPC ....... H04N 21/41422; H04N 21/44218; H04N 21/8547
See application file for complete search history.

(56) References Cited

U.S. PATENT DOCUMENTS

| | | | |
|---|---|---|---|
| 2007/0033607 A1 | 2/2007 | Bryan | |
| 2010/0122277 A1 | 5/2010 | Fonseca | |
| 2013/0030645 A1* | 1/2013 | Divine | B60K 35/00 709/217 |
| 2017/0085942 A1 | 3/2017 | Parmar et al. | |
| 2017/0251336 A1* | 8/2017 | Keller | H04N 23/611 |
| 2017/0359618 A1 | 12/2017 | Chen et al. | |
| 2018/0069930 A1* | 3/2018 | Brusco | H04M 9/00 |
| 2019/0069020 A1* | 2/2019 | Duan | H04N 21/43078 |

(Continued)

FOREIGN PATENT DOCUMENTS

| | | |
|---|---|---|
| CN | 101490762 A | 7/2009 |
| CN | 104866066 A | 8/2015 |

(Continued)

*Primary Examiner* — Mulugeta Mengesha
(74) *Attorney, Agent, or Firm* — Conley Rose, P.C.

(57) ABSTRACT

A media stream playing method includes: obtaining a first attribute parameter set when detecting that a first passenger views a first media stream played on a first vehicle-mounted screen, where the first attribute parameter set includes an identity of the first passenger and the first vehicle-mounted screen viewed by the first passenger; and when determining that attention of the first passenger is lost from the first vehicle-mounted screen, if determining, based on a stored second attribute parameter set, that a second vehicle-mounted screen that is viewed by a second passenger is the first vehicle-mounted screen, indicating to continue playing the first media stream on the first vehicle-mounted screen, where the second attribute parameter set includes an identity of the second passenger and the second vehicle-mounted screen.

20 Claims, 8 Drawing Sheets

(56) References Cited

U.S. PATENT DOCUMENTS

| | | |
|---|---|---|
| 2019/0086999 A1 | 3/2019 | Rickn et al. |
| 2019/0196679 A1* | 6/2019 | You .................. G06F 3/0484 |
| 2019/0208270 A1 | 7/2019 | Bates et al. |

FOREIGN PATENT DOCUMENTS

| | | | |
|---|---|---|---|
| CN | 105516804 | A | 4/2016 |
| CN | 107911745 | A | 4/2018 |
| CN | 109151183 | A | 1/2019 |
| CN | 109963194 | A | 7/2019 |
| EP | 3415394 | A1 | 12/2018 |
| WO | 2017075956 | A1 | 5/2017 |

* cited by examiner

MEDIA STREAM PLAYING METHOD AND APPARATUS

CROSS-REFERENCE TO RELATED APPLICATIONS

This application is a continuation of International Patent Application No. PCT/CN2020/099472, filed on Jun. 30, 2020, the disclosure of which is hereby incorporated by reference in its entirety.

TECHNICAL FIELD

The present disclosure relates to the field of intelligent vehicles, and in particular, to a media stream playing method and apparatus.

BACKGROUND

With continuous development of vehicle intelligence, a series of sensors are disposed in a vehicle to monitor behavior of a driver and a passenger, to ensure their safety and comfort. For example, when it is detected that the driver suffers from fatigue, the driver is reminded. When a living thing is detected in the vehicle after the vehicle owner locks the vehicle, the vehicle owner is reminded. When the passenger's physical and emotional changes are perceived, the passenger's tension may be relieved by adjusting light and a temperature in a vehicle, playing music, and the like. In addition, facial recognition may be performed on a passenger getting on the vehicle to authenticate an identity of the passenger, so as to prevent a person without an identity from getting on the vehicle.

In addition, a mobile phone and head unit interconnection mechanism, for example, a Mirrorlink, is further provided in the vehicle. Currently, most mobile phone and head unit interconnection technologies are applied to a head unit for sharing a latest application, chip, and technology corresponding to a mobile phone. For example, phone screen projection is used for navigation, and an artificial intelligence (AI) function of the mobile phone is used to train an autonomous driving program. In the conventional technology, head unit resources used for the mobile phone mainly focus on a microphone and a speaker of the head unit, and a vehicle-mounted intelligent perception system is seldom used.

A development trend in the future is that a mobile phone, a vehicle, and a smart home are connected, and the mobile phone is the center, to implement seamless transfer of experience at home, the vehicle, or another place. To achieve this goal, hardware resources, system capabilities, and service ecosystems of the mobile phone and the vehicle need to be integrated, to make a user feel that all devices seem like a virtual super device.

In a current audio and video playing method, when detecting that attention of the user is lost, a playing apparatus records an attention loss time, to continue playing from a marked attention loss point based on a request sent by the user when detecting that attention of the user returns. In this way, smoothness and integrity of viewing a video and audio by the user are ensured. According to the method, the video may be retrieved for the user whose attention is lost and continues to be played, but only video playing and retrieval of a single user are considered. As a quantity of passengers, vehicle-mounted screens, mobile phones, media sources, and the like in the vehicle increases, a relationship between the passengers, vehicle-mounted screens, mobile phones, and media sources also becomes very complex. In this case, the current video and audio control method for a user whose attention is lost cannot meet control requirements of a plurality of users and a plurality of complex relationships.

SUMMARY

The present disclosure provides a media stream playing method and apparatus to meet media stream playing requirements of a plurality of users and a plurality of complex relationships. Specifically, the following technical solutions are provided.

According to a first aspect, the present disclosure provides a media stream playing method. The method includes: obtaining a first attribute parameter set when detecting that a first passenger views a first media stream played on a first vehicle-mounted screen, where the first attribute parameter set includes an identity of the first passenger and the first vehicle-mounted screen viewed by the first passenger; and when determining that attention of the first passenger is lost from the first vehicle-mounted screen, if determining that a second vehicle-mounted screen that is viewed by a second passenger and that is in a stored second attribute parameter set is the first vehicle-mounted screen, indicating to continue playing the first media stream on the first vehicle-mounted screen, where the second attribute parameter set includes an identity of the second passenger and the second vehicle-mounted screen viewed by the second passenger.

In addition, the first attribute parameter set may further include information such as the first media stream and a seat number of the first passenger.

According to the method provided in this aspect, a first attribute parameter set including a vehicle-mounted screen viewed by the first passenger is established. When it is determined that the attention of the first passenger is lost, it is found by searching that a second attribute parameter set stored in a head unit also includes the first vehicle-mounted screen. In this case, it is determined that the first vehicle-mounted screen currently viewed by the first passenger is shared by the first passenger and another passenger, correspondingly indicating to continue playing a media stream on the first vehicle-mounted screen. Therefore, viewing experience of the another passenger is not affected when the vehicle-mounted screen and the media stream are turned off. This method meets media stream playing requirements of a plurality of users and a plurality of complex relationships.

With reference to the first aspect, in a possible implementation of the first aspect, the determining that attention of the first passenger is lost from the first vehicle-mounted screen includes: obtaining status information of the first passenger reported by a sensor module, where the status information of the first passenger is used to indicate a state of the first passenger viewing the first vehicle-mounted screen; and detecting, based on the status information of the first passenger, whether the attention of the first passenger is lost from the first vehicle-mounted screen.

If the status information of the first passenger is "Yes" at a time, it indicates that the first passenger views the first vehicle-mounted screen. If the status information of the first passenger is "No" at another time, it indicates that the first passenger does not currently view the first vehicle-mounted screen, that is, the attention is lost from the first vehicle-mounted screen.

Further, the status information of the first passenger may be periodically monitored and reported to the head unit by using the sensor module, for example, a camera or a radar.

The head unit obtains the status information of the first passenger, and stores the status information of the first passenger in a memory.

In this implementation, the status information of the first passenger reported by the sensor module is used to detect whether the attention of the first passenger is concentrated, so that the first vehicle-mounted screen and the first media stream in the first attribute parameter set can be timely adjusted when it is subsequently determined that the attention of the first passenger is lost.

With reference to the first aspect, in another possible implementation of the first aspect, the method further includes: updating media stream information of the first passenger when determining that the attention of the first passenger is lost from the first vehicle-mounted screen. The media stream information of the first passenger includes media stream source information and breakpoint information of the first passenger, and the breakpoint information of the first passenger includes a video frame or a timestamp of the first media stream played on the first vehicle-mounted screen when the attention of the first passenger is lost. In this implementation, the timely updating media stream information of the first passenger when determining that the attention of the first passenger is lost includes recording the breakpoint information of the first passenger, to provide necessary information for subsequent attention returning.

With reference to the first aspect, in still another possible implementation of the first aspect, the method further includes: when determining that the attention of the first passenger returns to a target vehicle-mounted screen, obtaining the media stream information of the first passenger; and indicating, based on the media stream source information in the media stream information of the first passenger and the video frame or the timestamp of the first media stream in the breakpoint information of the first passenger, to play the first media stream on the target vehicle-mounted screen.

In some implementations, the method includes: determining the first media stream based on the media stream source information in the media stream information of the first passenger; determining, based on the video frame or the timestamp of the first media stream, a video frame or a timestamp of the first media stream played when the attention of the first passenger is lost; and finally indicating to play the first media stream on the target vehicle-mounted screen.

The indicating to play the first media stream on the target vehicle-mounted screen includes: indicating the target vehicle-mounted screen to directly start playing the first media stream from the video frame or the timestamp, or asking the first passenger whether to start playing the first media stream from the video frame or the timestamp, and when an indication signal indicating confirmation by the first passenger is received, continuing to play the first media stream from the video frame or the timestamp. If no indication signal indicating confirmation by the first passenger is received, the first media stream is played again from a start frame.

It should be noted that the target vehicle-mounted screen may be the first vehicle-mounted screen, or may be another vehicle-mounted screen. This is not limited in the present disclosure.

In addition, the foregoing method further includes: when determining that the attention of the first passenger is lost from the first vehicle-mounted screen, indicating to send updated media stream information of the first passenger to a terminal device of the first passenger, for example, a mobile phone.

In this implementation, a state of a passenger viewing a vehicle-mounted screen is monitored in real time. Once it is detected that attention of the passenger is lost, breakpoint information of the passenger is recorded. In addition, when the attention of the passenger returns to the vehicle-mounted screen again, breakpoint playing and backhaul services are provided for the passenger. In this way, smoothness and integrity of viewing a media stream by the passenger are ensured. In addition, the breakpoint information may be transmitted back to the mobile phone terminal of the passenger. This implements a seamless connection between a person, a vehicle, and home when the media stream is played, and improves viewing experience of the user.

According to a second aspect, the present disclosure provides a media stream playing method. The method includes: obtaining a first attribute parameter set when detecting that a first passenger views a first media stream played on a first vehicle-mounted screen, where the first attribute parameter set includes an identity of the first passenger and the first media stream; and when determining that attention of the first passenger is lost from the first vehicle-mounted screen, if determining that a second media stream played on a second vehicle-mounted screen that is viewed by a second passenger and that is in a stored second attribute parameter set is the first media stream, indicating to continue playing the first media stream on the second vehicle-mounted screen corresponding to the second attribute parameter set, where the second attribute parameter set includes an identity of the second passenger and the second media stream viewed by the second passenger.

According to the method provided in this aspect, the first attribute parameter set including the first media stream viewed by the first passenger is established. When it is determined that the attention of the first passenger is lost, it is found by searching that a second attribute parameter set stored in a head unit also includes the first media stream. In this case, it is determined that the first media stream currently viewed by the first passenger is shared by the first passenger and another passenger, indicating to continue playing the first media stream on a corresponding vehicle-mounted screen. Therefore, viewing experience of the another passenger is not affected when a vehicle-mounted screen is turned off and playing of the first media stream is paused. This method meets media stream playing requirements of a plurality of users and a plurality of complex relationships.

With reference to the second aspect, in a possible implementation of the second aspect, the determining that attention of the first passenger is lost from the first vehicle-mounted screen includes: obtaining status information of the first passenger reported by a sensor module, where the status information of the first passenger is used to indicate a state of the first passenger viewing the first vehicle-mounted screen; and detecting, based on the status information of the first passenger, whether the attention of the first passenger is lost from the first vehicle-mounted screen.

With reference to the second aspect, in another possible implementation of the second aspect, the method further includes: updating media stream information of the first passenger when determining that the attention of the first passenger is lost from the first vehicle-mounted screen. The media stream information of the first passenger includes media stream source information and breakpoint information of the first passenger, and the breakpoint information of the first passenger includes a video frame or a timestamp of the first media stream played on the first vehicle-mounted screen when the attention of the first passenger is lost.

With reference to the second aspect, in still another possible implementation of the second aspect, the method further includes: when determining that the attention of the first passenger returns to a target vehicle-mounted screen, obtaining the media stream information of the first passenger; and indicating, based on the media stream source information in the media stream information of the first passenger and the video frame or the timestamp of the first media stream in the breakpoint information of the first passenger, to play the first media stream on the target vehicle-mounted screen.

With reference to the second aspect, in yet another possible implementation of the second aspect, the method further includes: when determining that the attention of the first passenger is lost from the first vehicle-mounted screen, indicating to send updated media stream information of the first passenger to a terminal device of the first passenger.

According to a third aspect, the present disclosure provides a media stream playing apparatus. The apparatus may include an obtaining unit, a detection unit, an indication unit, and the like. The obtaining unit is configured to obtain a first attribute parameter set when detecting that a first passenger views a first media stream played on a first vehicle-mounted screen. The first attribute parameter set includes an identity of the first passenger and the first vehicle-mounted screen viewed by the first passenger. The detection unit is configured to detect whether attention of the first passenger is lost from the first vehicle-mounted screen. The indication unit is configured to: when the detection unit determines that the attention of the first passenger is lost from the first vehicle-mounted screen, if it is determined that a second vehicle-mounted screen that is viewed by a second passenger and that is in a stored second attribute parameter set is the first vehicle-mounted screen, indicate to continue playing the first media stream on the first vehicle-mounted screen. The second attribute parameter set includes an identity of the second passenger and the second vehicle-mounted screen viewed by the second passenger.

With reference to the third aspect, in a possible implementation of the third aspect, the obtaining unit is further configured to obtain status information of the first passenger reported by a sensor module. The status information of the first passenger is used to indicate a state of the first passenger viewing the first vehicle-mounted screen. The detection unit is further configured to detect, based on the status information of the first passenger, whether the attention of the first passenger is lost from the first vehicle-mounted screen.

With reference to the third aspect, in another possible implementation of the third aspect, the apparatus further includes an updating unit. The updating unit is configured to update media stream information of the first passenger when the detection unit determines that the attention of the first passenger is lost from the first vehicle-mounted screen. The media stream information of the first passenger includes media stream source information and breakpoint information of the first passenger, and the breakpoint information of the first passenger includes a video frame or a timestamp of the first media stream played on the first vehicle-mounted screen when the attention of the first passenger is lost.

With reference to the third aspect, in still another possible implementation of the third aspect, the obtaining unit is further configured to obtain the media stream information of the first passenger when the detection unit detects that the attention of the first passenger returns to a target vehicle-mounted screen. The indication unit is further configured to indicate, based on the media stream source information in the media stream information of the first passenger and the video frame or the timestamp of the first media stream in the breakpoint information of the first passenger, to play the first media stream on the target vehicle-mounted screen.

With reference to the third aspect, in yet another possible implementation of the third aspect, the indication unit is further configured to: when the detection unit determines that the attention of the first passenger is lost from the first vehicle-mounted screen, indicate to send the media stream information of the first passenger to a terminal device of the first passenger.

In addition, optionally, in the third aspect, the obtaining unit is configured to obtain the first attribute parameter set when detecting that the first passenger views the first media stream played on the first vehicle-mounted screen. The first attribute parameter set includes the identity of the first passenger and the first vehicle-mounted screen viewed by the first passenger. The detection unit is configured to detect whether the attention of the first passenger is lost from the first vehicle-mounted screen. The indication unit is configured to: when the detection unit determines that the attention of the first passenger is lost from the first vehicle-mounted screen, if it is determined that the second vehicle-mounted screen that is viewed by the second passenger and that is in the stored second attribute parameter set is the first vehicle-mounted screen, indicate to continue playing the first media stream on the first vehicle-mounted screen. The second attribute parameter set includes the identity of the second passenger and the second vehicle-mounted screen viewed by the second passenger.

According to a fourth aspect, the present disclosure provides a hardware apparatus. The apparatus includes a processor and a memory, and the processor is coupled to the memory. The memory is configured to store computer program instructions. The processor is configured to execute the instructions stored in the memory, so that the apparatus performs the method according to any one of the first aspect and the implementations of the first aspect, or the method according to any one of the second aspect and the implementations of the second aspect.

Functions of the units and modules in the third aspect, such as the obtaining unit, the detection unit, and the indication unit, may be implemented by using the processor and the memory.

Optionally, the apparatus is a processing chip or a processing circuit.

Optionally, the apparatus is a head unit, or a motor vehicle including the head unit.

In addition, the apparatus may further include at least one interface, and components such as a transceiver, a sensor module, and a vehicle-mounted screen.

According to a fifth aspect, an embodiment of the present disclosure further provides a computer-readable storage medium. The storage medium stores instructions. When the instructions are run on a computer or a processor, the instructions are used to perform the method according to the first aspect and the implementations of the first aspect, or used to perform the method according to the second aspect and the implementations of the second aspect.

In addition, an embodiment of the present disclosure further provides a computer program product. The computer program product includes computer instructions. When the instructions are executed by a computer or a processor, the method according to the implementations of the first aspect or the second aspect can be implemented.

It should be noted that advantageous effects of the technical solutions in the implementations of the second aspect to the fifth aspect are the same as advantageous effects of the first aspect and the implementations of the first aspect. For details, refer to descriptions of advantageous effects in the first aspect and the implementations of the first aspect. Details are not described again.

DESCRIPTION OF EMBODIMENTS

The following describes the technical solutions of the present disclosure with reference to embodiments and the accompanying drawings of the present disclosure. To facilitate understanding of the technical solutions provided in embodiments of the present disclosure, an application scenario to which the technical solutions are applicable is first described.

Figure 1:
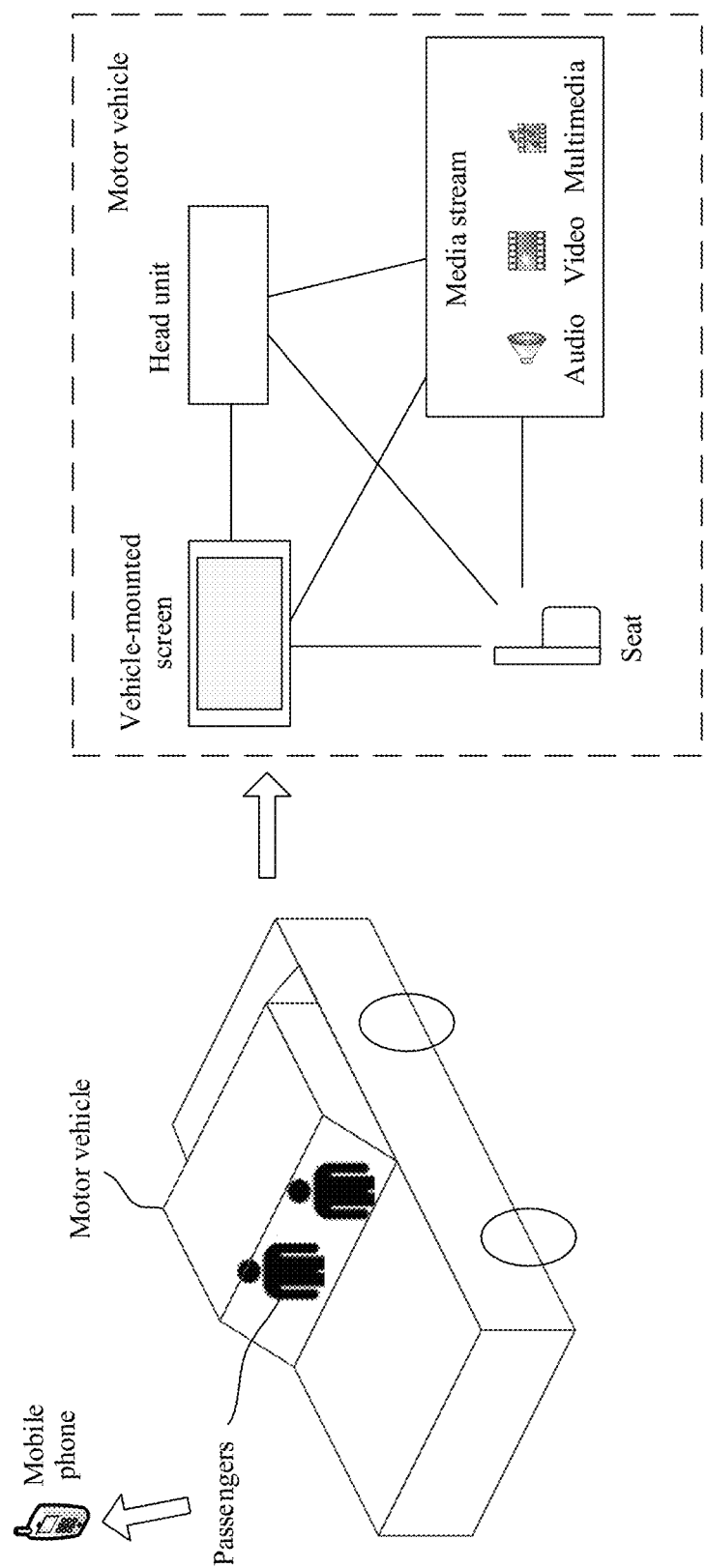
FIG. 1 is a diagram of a system architecture of an intelligent vehicle according to an embodiment of the present disclosure.

The technical solutions of the present disclosure are applicable to various technical scenarios of media stream playing, and in particular, media stream playing on a vehicle-mounted screen of an intelligent vehicle. For example, FIG. 1 is an architecture diagram of a media stream playing system according to the present disclosure. The system includes a motor vehicle and a passenger. In addition, the system may further include a terminal device held by the passenger. The terminal device is a device interconnected to the motor vehicle, and the terminal device is a portable device carried by the passenger when the passenger gets on the vehicle. The motor vehicle is also referred to as a "vehicle".

The terminal device includes but is not limited to a mobile phone, a tablet computer (Pad), a personal computer (PC), a camera, a wearable device, and the like. A specific device form of the terminal device is not limited in embodiments of the present disclosure. In addition, an operating system running on the terminal device includes but is not limited to Apple iOS, Android, Windows, Linux, or the like.

Figure 2:
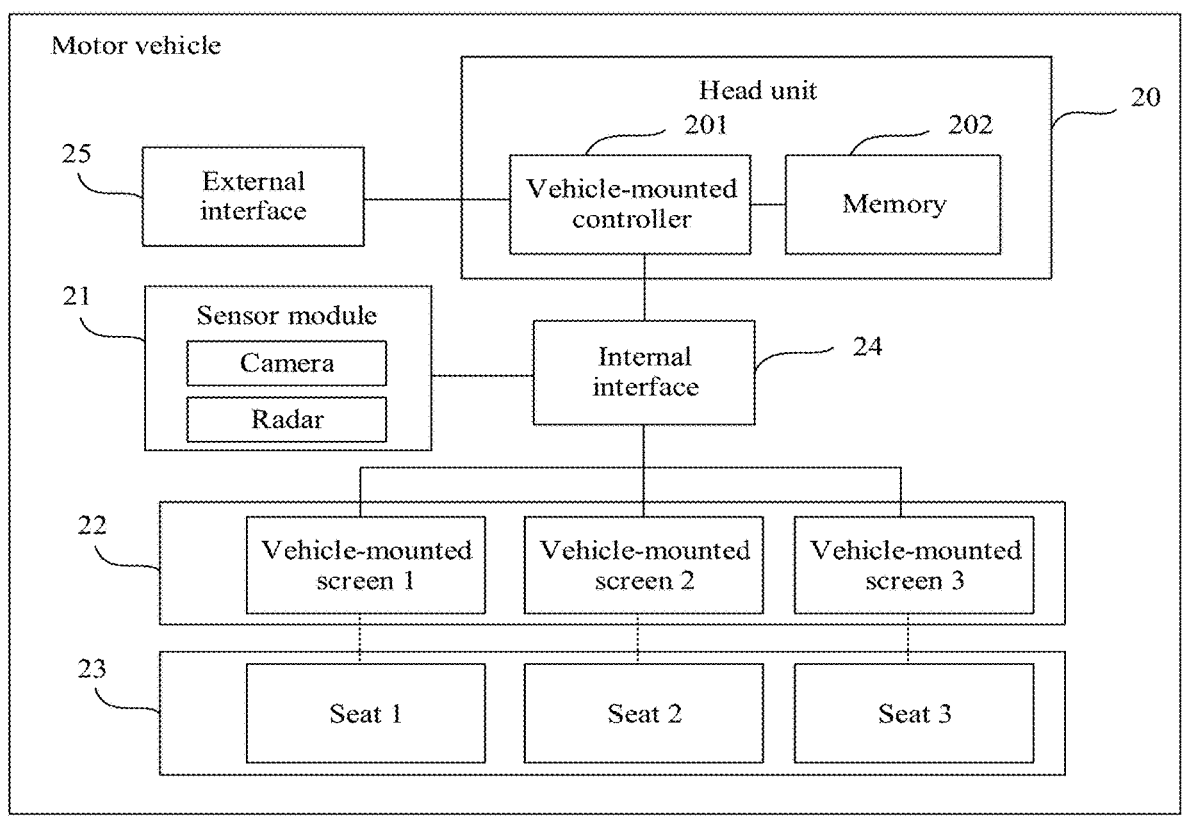
FIG. 2 is a schematic diagram of a structure of a motor vehicle according to an embodiment of the present disclosure.

The vehicle includes components such as a head unit, a vehicle-mounted screen, and seats. In some embodiments, as shown in FIG. 2, the vehicle includes components such as a head unit 20, a sensor module 21, a vehicle-mounted screen set 22, a passenger seat set 23, an internal interface 24, and an external interface 25.

The head unit 20 is short for an automotive infotainment product installed in the vehicle. The head unit 20 has a function of implementing information communication between a person and the vehicle and between the vehicle and the outside (between vehicles). The head unit 20 includes a vehicle-mounted controller 201 and a memory 202, and the vehicle-mounted controller 201 is coupled to the memory 202. It should be understood that the head unit 20 may further include more other components such as a wireless communication module and a power management module. This is not limited in this embodiment.

The memory 202 is configured to store a media stream. The media stream includes but is not limited to information such as audio, a video, multimedia, and a navigation map. In addition, the memory 202 is further configured to store information such as instructions and a computer program. Optionally, the memory 202 is also referred to as a head unit memory or a storage medium.

The vehicle-mounted controller 201 is configured to invoke the media stream in the memory 202 and play the media stream on a vehicle-mounted screen. In addition, the vehicle-mounted controller 201 is further configured to: obtain measurement parameters reported by the sensor module 21, process the measurement parameters, and control the external interface 25 to connect to an external device. In addition, the vehicle-mounted controller 201 may be connected to each vehicle-mounted screen in the vehicle-mounted screen set 22 through the internal interface 24, so that the vehicle-mounted controller 201 may control turn-on and turn-off of each vehicle-mounted screen, play a media stream after turn-on, and the like.

The sensor module 21 may include one or more sensors, for example, a camera or a millimeter-wave radar, and the sensor module 21 is connected to the vehicle-mounted controller 201 through the internal interface 24.

The internal interface 24 is configured to connect the vehicle-mounted controller 201 to components such as the sensor module 21 and the vehicle-mounted screen set 22. In addition, the internal interface 24 may be a wired interface or a wireless interface. The external interface 25 is configured to connect the head unit 20 to an external device such as a mobile phone. For example, the external interface 25 may be a universal serial bus (USB) interface, for example, may be a mini USB interface, a micro USB interface, or a USB type-C interface. Optionally, the external interface 25 may alternatively be a wireless interface, for example, connected to an external device such as a mobile phone by using a wireless communication module. A wired or wireless connection manner between the head unit and the terminal device is not limited in this embodiment.

In addition, the sensor module 21, the internal interface 24, and the external interface 25 may be disposed inside the head unit 20, or may be disposed outside the head unit 20. This is not limited in this embodiment.

The vehicle-mounted screen set 22 includes at least one vehicle-mounted screen, for example, a vehicle-mounted screen 1, a vehicle-mounted screen 2, and a vehicle-mounted screen 3. Correspondingly, the passenger seat set 23 may also include at least one seat, for example, a seat 1, a seat 2, and a seat 3, and a correspondence between each seat and a vehicle-mounted screen may be a one-to-one correspondence or one-to-many correspondence.

The scenarios shown in FIG. 1 and FIG. 2 may include the following various scenarios.

Figure 3A:
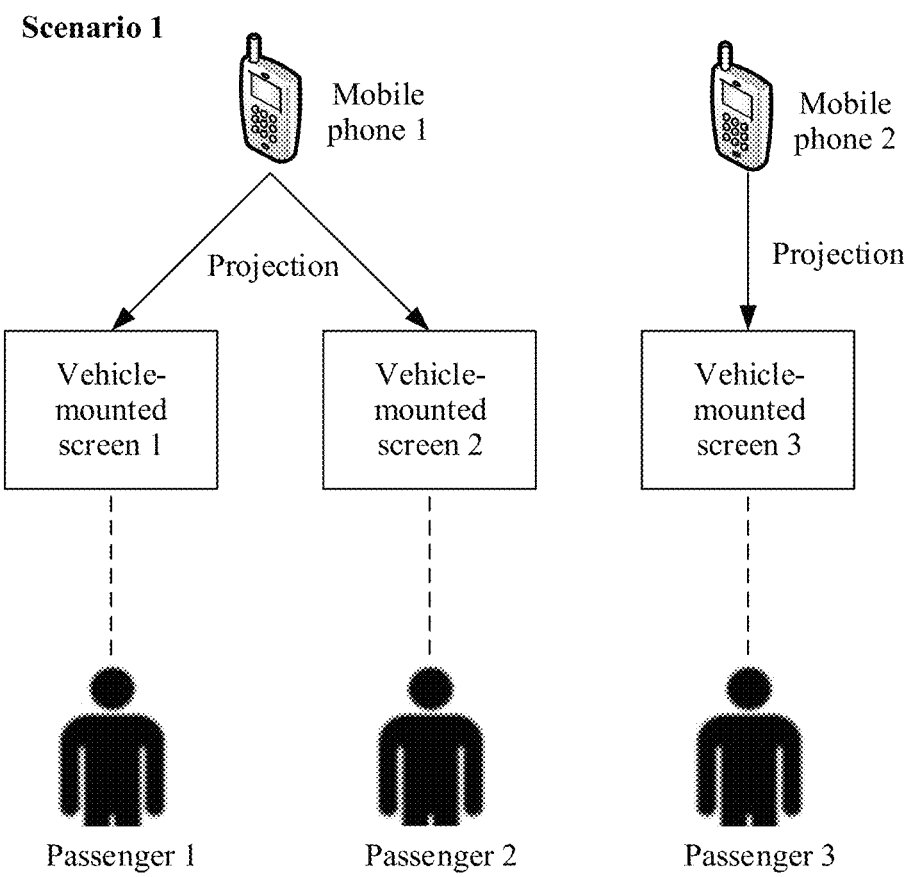
FIG. 3A is a schematic diagram of an application scenario according to an embodiment of the present disclosure.

Scenario 1: As shown in FIG. 3A, three vehicle-mounted screens, three passengers, three seats, and two mobile phone terminals are included in the vehicle scenario. Each passenger correspondingly views one vehicle-mounted screen. For example, a passenger 1 views a vehicle-mounted screen 1, a passenger 2 views a vehicle-mounted screen 2, and a passenger 3 views a vehicle-mounted screen 3. In addition, media streams played on the vehicle-mounted screen 1 and the vehicle-mounted screen 2 are both projected from a mobile phone 1. A holder of the mobile phone 1 is the passenger 1 or the passenger 2. In addition, a media stream played on the vehicle-mounted screen 3 is projected from a mobile phone 2, and a holder of the mobile phone 2 is the passenger 3. In addition, locations of the passengers may be distinguished by using seat numbers. For example, a seat identifier of the passenger 1 is a seat 1, a seat identifier of the passenger 2 is a seat 2, and a seat identifier of the passenger 3 is a seat 3.

Figure 3B:
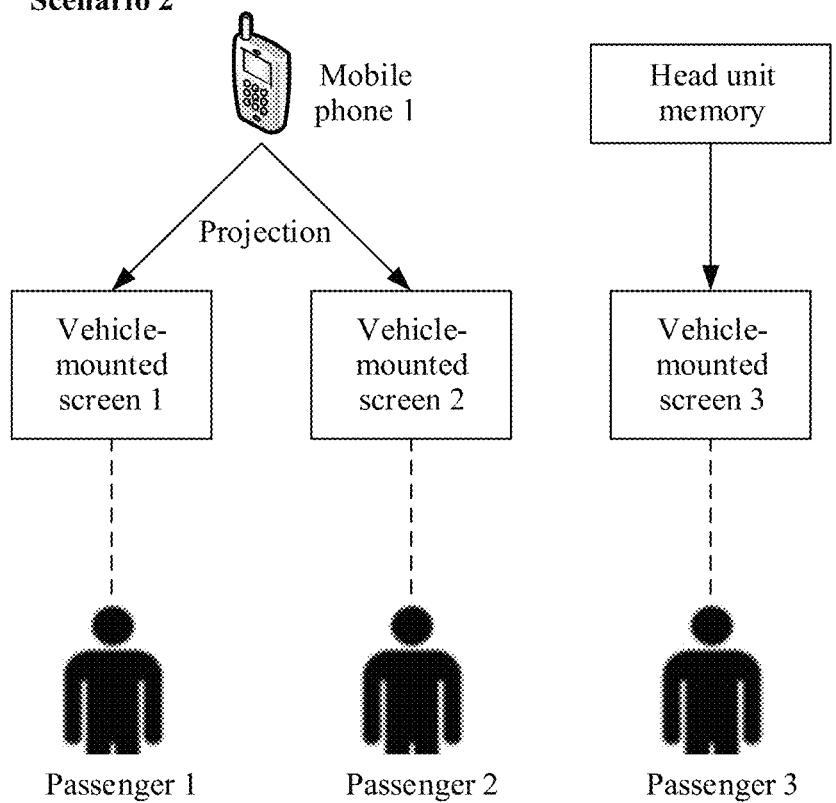
FIG. 3B is a schematic diagram of another application scenario according to an embodiment of the present disclosure.

Scenario 2: As shown in FIG. 3B, this scenario is similar to the "scenario 1", and a difference lies in that the media stream played on the vehicle-mounted screen 3 comes from a head unit memory, but is not projected from the mobile phone of the passenger 3. The head unit memory is the memory 202 in the head unit, and is configured to store content such as a media stream.

Figure 3C:
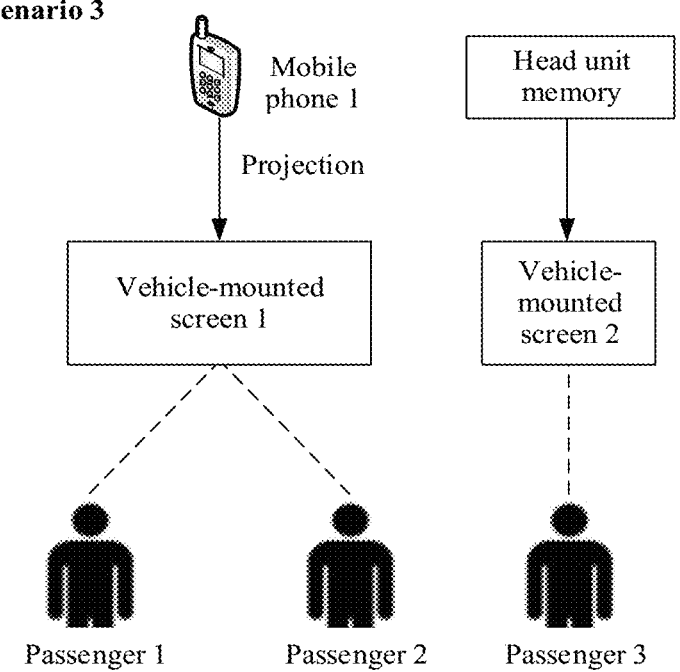
FIG. 3C is a schematic diagram of still another application scenario according to an embodiment of the present disclosure.

Scenario 3: As shown in FIG. 3C, two vehicle-mounted screens, three passengers, and one mobile phone terminal are included in the vehicle scenario. The passenger 1 and the passenger 2 jointly view the vehicle-mounted screen 1, a media stream played on the vehicle-mounted screen 1 is projected from the mobile phone 1, and a holder of the mobile phone 1 is the passenger 1 or the passenger 2. The passenger 3 views the vehicle-mounted screen 2, and a media stream played on the vehicle-mounted screen 2 comes from a head unit memory.

Figure 3D:
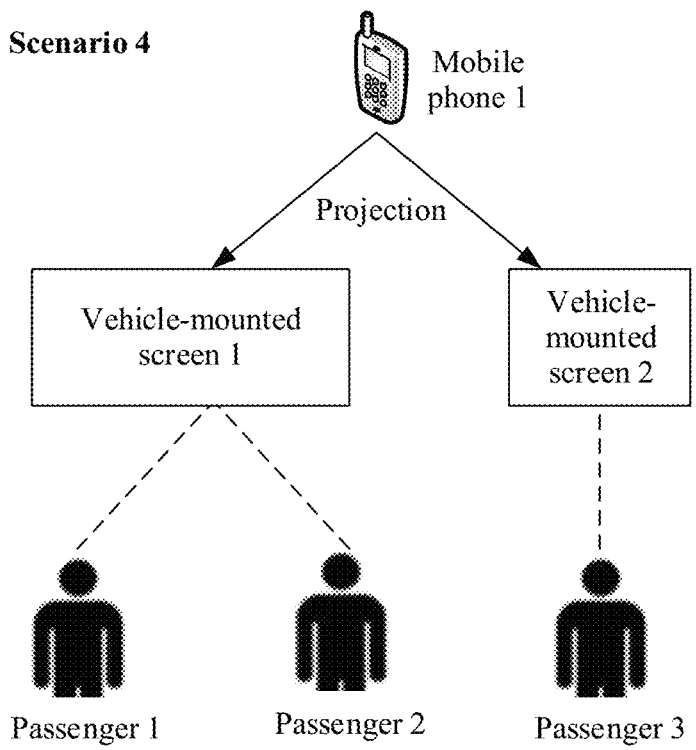
FIG. 3D is a schematic diagram of yet another application scenario according to an embodiment of the present disclosure.

Scenario 4: As shown in FIG. 3D, this scenario is similar to the "scenario 3", and a difference lies in that media streams played on the vehicle-mounted screen 1 and the vehicle-mounted screen 2 are both projected from the mobile phone 1.

It should be understood that the application scenario in embodiments of the present disclosure may further include factors such as more vehicle-mounted screens, mobile phone terminals, passengers, and seat numbers, and an association relationship between the vehicle-mounted screens, the mobile phones, the passengers, and sources of media streams played on the vehicle-mounted screens is not limited.

In the foregoing various scenarios, based on an interconnection between the terminal device and the head unit, the passenger may use a projection technology, for example, MirrorLink application software, to project an image of the terminal device on the vehicle-mounted screen, so that the passenger can conveniently view the image of the terminal device by using the vehicle-mounted screen when getting on the vehicle, for example, view a video of the mobile phone terminal by using the vehicle-mounted screen. A driver can use the projection technology to project an image of a mobile phone to the vehicle-mounted screen, so that the passenger can conveniently perform a control operation on the vehicle-mounted screen, for example, answering a call, making a call, listening to phone music, watching a movie, and using a navigation function of the mobile phone.

Mirrorlink is a standard jointly established by some international well-known mobile phone manufacturers and automobile manufacturers, and aims to normalize an effective connection between a smartphone and a vehicle-mounted system and form good user experience. When a mobile phone is interconnected to a head unit according to this standard, bidirectional control from the mobile phone and the head unit may be implemented for specific application software, so that a user does not need to look at a mobile phone screen, touch the mobile phone screen, or operate a button of the mobile phone during driving. Instead, the user only needs to control the mobile phone, including answering a call, making a call, listening to phone music, using a navigation function of the mobile phone, and the like, by using a physical button on a cockpit or a voice command. Certainly, the mobile phone itself is also operable at this time.

The following embodiments describe the technical solutions of the present disclosure in detail.

An embodiment provides a media stream playing method. The method may be performed by a head unit 20, or may be performed by a vehicle-mounted controller 201 or a chip disposed in the head unit 20, to control media stream content played on a vehicle-mounted screen. In this way, user requirements of a plurality of passengers and a plurality of association relationships are met.

Figure 4A:
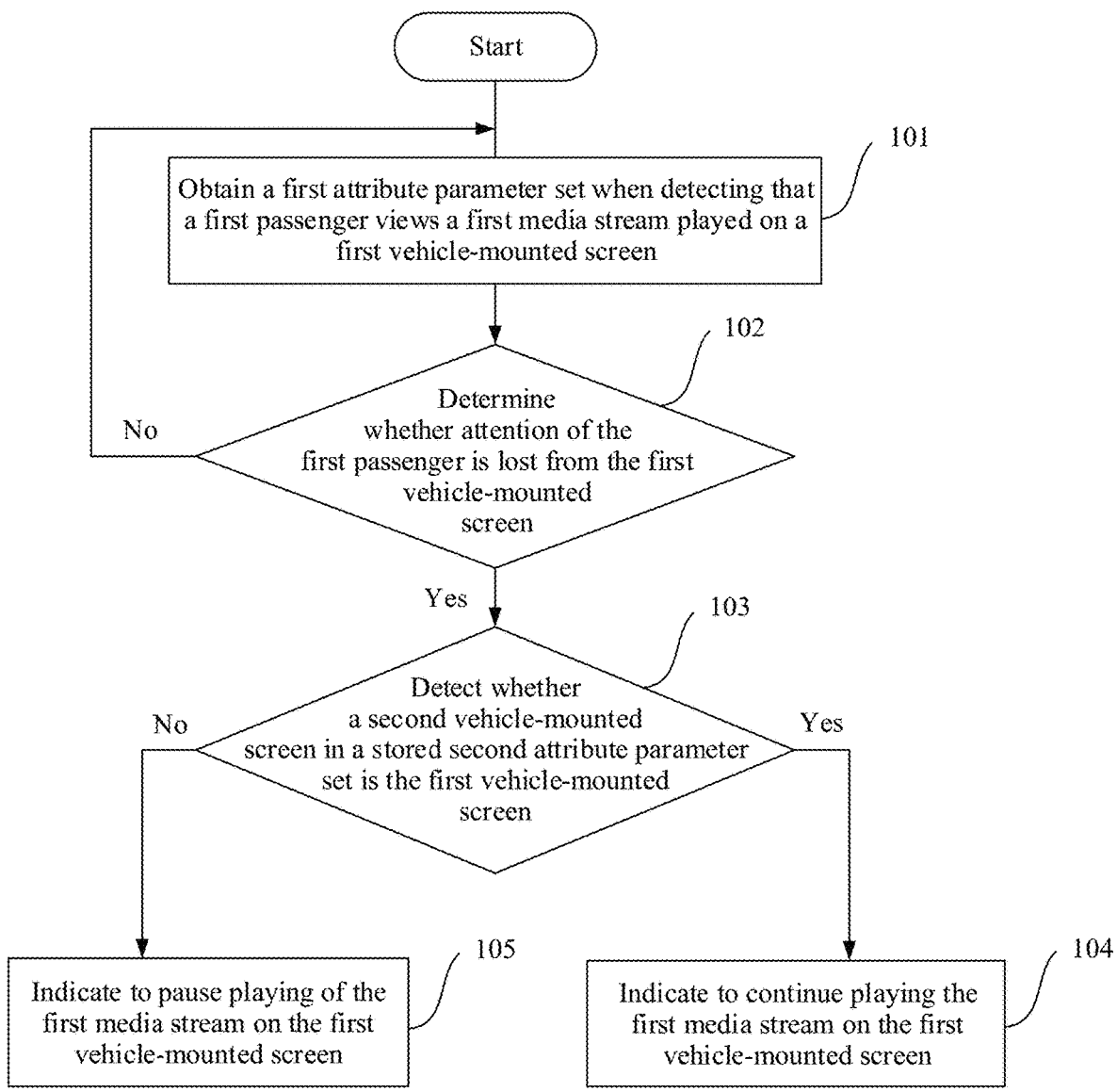
FIG. 4A is a flowchart of a media stream playing method according to an embodiment of the present disclosure.

As shown in FIG. 4A, the method includes the following steps.

101: Obtain a first attribute parameter set when detecting that a first passenger views a first media stream played on a first vehicle-mounted screen.

In an implementation, the first attribute parameter set includes an identity of the first passenger and the first vehicle-mounted screen viewed by the first passenger. The first attribute parameter set is a parameter set including a first parameter and all parameters associated with the first parameter. The first parameter may be the identity of the first passenger or the first vehicle-mounted screen. For ease of description, an example in which the first parameter is the identity of the first passenger is used for description in this embodiment.

In another implementation, the first attribute parameter set includes: an identity of the first passenger and the first media stream that is currently played on the first vehicle-mounted screen and viewed by the first passenger.

Identities of passengers are used to distinguish the passengers in a vehicle, and the identities may be set by a head unit. This is not limited in this embodiment.

When the first passenger views, on a seat 1, the first vehicle-mounted screen corresponding to the seat 1, and the first media stream is played on the first vehicle-mounted screen, the first attribute parameter set further includes information corresponding to the first media stream, and the information may be referred to as first media stream information. The first media stream information includes media stream source information and breakpoint information. The media stream source information includes information for identifying the media stream, such as a title of a film/TV series and a music name/song name. The breakpoint information may carry a video frame or a timestamp of the media stream played when attention of the passenger is lost. In this embodiment, at the beginning, that is, before the attention of the first passenger is lost, the breakpoint information of the first passenger is empty.

It should be understood that the first attribute parameter set may further include another attribute parameter, for example, information such as a mobile phone identifier of the first passenger and a seat number of the first passenger. This is not limited in this embodiment.

For example, the step 101 specifically includes establishing the first attribute parameter set of the first passenger when the first passenger is seated on the seat 1 and views the first media stream played on the first vehicle-mounted screen. For example, the head unit detects that the first passenger (or referred to as a "passenger 1") is using a MirrorLink function of a mobile phone 1 to project an image of the mobile phone (the "mobile phone 1") of the first passenger onto a vehicle-mounted screen 1, and the passenger 1 views a video source 1 played on the vehicle-mounted screen 1. In this case, the established first attribute parameter set includes {the passenger 1, the vehicle-mounted screen 1, the mobile phone 1, the video source 1, the video source 1 being projected from the mobile phone 1, and the seat 1}. The mobile phone 1 is a mobile phone identifier of the passenger 1, the seat 1 is a seat number of the passenger 1, and the video source 1 is the first media stream currently played on the vehicle-mounted screen 1.

In addition, the first attribute parameter set may further include status information of the first passenger. The status information of the first passenger is used to indicate a state of the first passenger viewing the vehicle-mounted screen. For example, at a first time (time 1, t1), if the passenger 1 views the vehicle-mounted screen 1, the status information of the passenger 1 is marked as "Yes"; or if the passenger 1 does not view the vehicle-mounted screen 1, the status information is marked as "No".

The first attribute parameter set may be established by using measurement parameters reported by a sensor module. For example, the identity of the passenger 1 is obtained by using a facial recognition function of a camera, and it is determined, by using an eyeball recognition function of the camera, that the passenger 1 views the vehicle-mounted screen 1. In this case, the status information of the first passenger is recorded as "Yes", and the breakpoint information in the first media stream is set to empty.

Similarly, according to the foregoing method, the sensor module periodically measures and obtains the status information of the first passenger, and reports the information to the head unit in real time.

Similarly, if another passenger in the vehicle, for example, a second passenger or a third passenger, also views the vehicle-mounted screen, status information of these passengers reported by the sensor module is also periodically obtained. An attribute parameter set of each passenger, for example, a second attribute parameter set of the second passenger, is dynamically established. All attribute parameter sets are stored in a head unit memory.

102: Detect whether the attention of the first passenger is lost from the first vehicle-mounted screen, that is, determine whether the first passenger continues viewing the first media stream played on the first vehicle-mounted screen.

The head unit determines, based on status information of the first passenger obtained in each period, whether the attention is lost. If the status information of the first passenger at a detection time, for example, at the time t1 is "Yes", it indicates that the first passenger views the first vehicle-mounted screen. The status information of the first passenger continues to be periodically obtained, to keep monitoring an attention concentration status of the first passenger.

If the status information of the first passenger at a time t2 is "No", it indicates that the first passenger does not view the first vehicle-mounted screen at the time t2, that is, the attention is lost from the first vehicle-mounted screen. In this case, step 103 is performed. For example, when the camera detects, at the time t2, that the passenger 1 has closed eyes, or it is determined, by using breathing Doppler measured by a radar, that the passenger 1 is currently in a sleep state, the status information of the first passenger is updated to "No", and is reported to the head unit.

103: If yes, that is, if the attention of the first passenger is lost, detect whether a second vehicle-mounted screen in a stored second attribute parameter set is the first vehicle-mounted screen, where the second vehicle-mounted screen is a screen currently viewed by the second passenger.

The second attribute parameter set includes parameters such as an identity of the second passenger, a target vehicle-mounted screen viewed by the second passenger, a media stream played on the second vehicle-mounted screen, and status information of the second passenger.

104: If yes, it indicates that the first vehicle-mounted screen is shared by the first passenger and the second passenger, indicate to continue playing the first media stream on the first vehicle-mounted screen.

In addition, the foregoing method further includes updating the media stream information of the first passenger when it is determined that the attention of the first passenger is lost from the first vehicle-mounted screen. The updating media stream information of the first passenger includes updating the breakpoint information of the first passenger in the media stream information. The breakpoint information of the first passenger includes information such as the video frame or the timestamp of the first media stream played on the first vehicle-mounted screen when the attention of the first passenger is lost. In addition, the sensor module monitors and reports the status information of the first passenger in real time, so that the attention concentration status of the first passenger can be subsequently found timely.

A detection result in the step 103 being "Yes" specifically includes the following cases.

Case (1): There is at least one second attribute parameter set, and the second vehicle-mounted screen included in the second attribute parameter set is the first vehicle-mounted screen. In this case, the head unit indicates the first vehicle-mounted screen to continue playing the first media stream.

For example, in the "scenario 3" shown in FIG. 3C, the first passenger is the passenger 1. The first attribute parameter set is an attribute parameter set of the passenger 1. The attribute parameter set of the passenger 1 includes {the passenger 1, the vehicle-mounted screen 1, the video source 1, the video source 1 being projected from the mobile phone 1, and the seat 1}. When it is detected that the attention of the passenger 1 is lost, one second attribute parameter set has been stored in the head unit memory, and a vehicle-mounted screen included in the second attribute parameter set is the vehicle-mounted screen 1. For example, the second attribute parameter set includes {the passenger 2, the vehicle-mounted screen 1, the video source 1, the video source 1 being projected from the mobile phone 1, the seat 2, and status information of the passenger 2 being "Yes"}. In this case, same parameters included in the first attribute parameter set and the second attribute parameter set are the vehicle-mounted screen 1, the video source 1, and the video source 1 being projected from the mobile phone 1. It indicates that, originally, the passenger 1 and the passenger 2 jointly view the video source 1 played on the vehicle-mounted screen 1, but now the attention of the passenger 1 is lost. In this case, the video source 1 is indicated to continue to be played on the vehicle-mounted screen 1, to ensure that video viewing of the passenger 2 is not affected. At the same time, the breakpoint information of the passenger 1 is recorded.

Figure 4B:
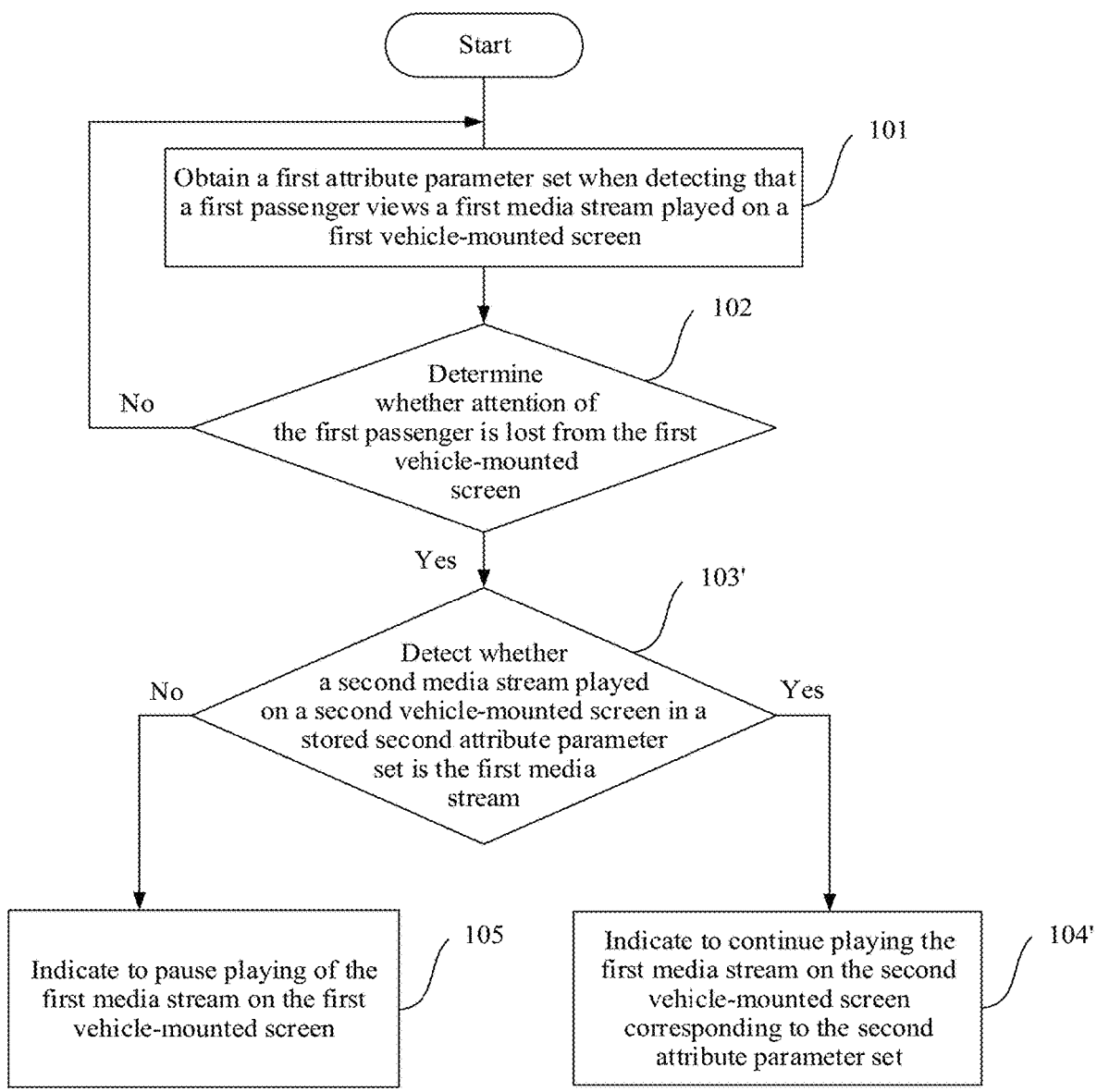
FIG. 4B is a flowchart of another media stream playing method according to an embodiment of the present disclosure.

In addition, in another implementation, as shown in FIG. 4B, after the step 102, the method further includes the following steps.

103': If yes, that is, if the attention of the first passenger is lost, detect whether a second media stream played on the second vehicle-mounted screen in the stored second attribute parameter set is the first media stream, where the second attribute parameter set includes information such as the second vehicle-mounted screen, the second media stream, and an identity of the second passenger, and the second media stream viewed by the second passenger is currently played on the second vehicle-mounted screen.

104': If yes, indicate to continue playing the first media stream on the second vehicle-mounted screen corresponding to the second attribute parameter set.

Case (2): There is at least one second attribute parameter set, and the second media stream included in the second attribute parameter set is the same as the first media stream in the first attribute parameter set. In this case, the head unit indicates the second vehicle-mounted screen to continue playing the first media stream.

For example, in the "scenario 1" shown in FIG. 3A or the "scenario 2" shown in FIG. 3B, the first passenger is the passenger 1, and the first attribute parameter set is the attribute parameter set of the passenger 1. The attribute parameter set of the passenger 1 includes {the passenger 1, the vehicle-mounted screen 1, the video source 1, the video source 1 being projected from the mobile phone 1, and the seat 1}. When the attention of the passenger 1 is lost, a second attribute parameter set is stored in the head unit memory, and the second attribute parameter set includes the "video source 1". For example, the passenger 2 is used as an example. The second attribute parameter set includes {the passenger 2, the vehicle-mounted screen 2, the video source 1, the video source 1 being projected from the mobile phone 1, the seat 2, and the status information of the passenger 2 being "Yes"}. Same parameters included in the first attribute parameter set and the second attribute parameter set are the video source 1, and the video source 1 being projected from the mobile phone 1. It indicates that, originally, the passenger 1 and the passenger 2 respectively view the video source 1 on the vehicle-mounted screen 1 and the vehicle-mounted screen 2. The video source 1 is projected from the mobile phone 1. In this case, when the attention of the passenger 1 is lost, the vehicle-mounted screen 2 is controlled to continue playing the video source 1, to ensure that video viewing of the passenger 2 is not affected. At the same time, the breakpoint information of the passenger 1 is recorded.

In addition, the foregoing method further includes: Because the attention of the passenger 1 is lost and no other passenger views the video source 1 on the vehicle-mounted screen 1, the head unit may control the vehicle-mounted screen 1 to stop playing the video source 1 and turn off the vehicle-mounted screen 1.

Optionally, if the second attribute parameter set further includes the first vehicle-mounted screen, that is, both the first vehicle-mounted screen and the first media stream are common parameters included in the first attribute parameter set and the second attribute parameter set, in addition to performing the step 104', the method further includes indicating to continue playing the first media stream on the first vehicle-mounted screen.

This case includes a combination of the foregoing "case (1)" and "case (2)". To be specific, when the second attribute parameter set includes the first vehicle-mounted screen and the first media stream, the first media stream continues to be played on the first vehicle-mounted screen and on the second vehicle-mounted screen.

For example, in the "scenario 4" shown in FIG. 3D, the first passenger is the passenger 1, and the first attribute parameter set is the attribute parameter set of the passenger 1. The attribute parameter set of the passenger 1 includes {the passenger 1, the vehicle-mounted screen 1, the video source 1, the video source 1 being projected from the mobile phone 1, and the seat 1}. In addition, the head unit memory further stores attribute parameter sets of the passenger 2 and the passenger 3. The attribute parameter set of the passenger 2 includes {the passenger 2, the vehicle-mounted screen 1, the video source 1, the video source 1 being projected from the mobile phone 1, and the seat 2}. The attribute parameter set of the passenger 3 includes {the passenger 3, the vehicle-mounted screen 2, the video source 1, the video source 1 being projected from the mobile phone 1, and the seat 3}. Attention of the passenger 2 and the passenger 3 is focused on respective vehicle-mounted screens.

It is detected that the attention of the passenger 1 is lost. In this case, because attribute parameters including the vehicle-mounted screen 1, the video source 1, and the video source 1 being projected from the mobile phone are common attribute parameters in the second attribute parameter set of the passenger 2 and the first attribute parameter set of the passenger 1, the head unit indicates to continue playing the video source 1 on the vehicle-mounted screen 1, to ensure that video viewing of the passenger 2 is not affected. Similarly, attribute parameters such as the video source 1 and the video source 1 being projected from the mobile phone 1 are common attribute parameters in the third attribute parameter set of the passenger 3 and the first attribute parameter set of the passenger 1. Therefore, the head unit indicates to continue playing the video source 1 on the vehicle-mounted screen 2, to ensure that video viewing of the passenger 3 is not affected. In addition, the breakpoint information of the passenger 1 is updated, and a video frame or a timestamp of the video source 1 played on the vehicle-mounted screen 1 at a current detection time is recorded.

In addition, a determining process in the step 103 or the step 103' further includes the following step.

105: If no, that is, all attribute parameter sets stored in the head unit do not include the first vehicle-mounted screen or the first media stream, indicate the first vehicle-mounted screen to pause playing of the first media stream, and turn off the first vehicle-mounted screen. In addition, the breakpoint information of the first passenger is updated, and the sensor module continues to dynamically monitor the status information of the first passenger in real time.

For example, in the "scenario 1" shown in FIG. 3A, it is assumed that the first passenger is the passenger 3. The first attribute parameter set is an attribute parameter set of the passenger 3. The attribute parameter set of the passenger 3 includes {the passenger 3, the vehicle-mounted screen 3, the video source 3, the video source 3 being projected from the mobile phone 2, the seat 3}. When attention of the passenger 3 is lost, in attribute parameter sets of the passenger 2 and the passenger 3 stored in the head unit memory, the attribute parameter set of the passenger 1 includes {the passenger 1, the vehicle-mounted screen 1, the video source 1, the video source 1 being projected from the mobile phone 1, the seat 1, and status information of the passenger 1 being "Yes"}, and the attribute parameter set of the passenger 2 includes {the passenger 2, the vehicle-mounted screen 2, the video source 1, the video source 1 being projected from the mobile phone 1, the seat 2, and status information of the passenger 2 being "Yes"}. In this case, neither the attribute parameter set of the passenger 2 nor the attribute parameter set of the passenger 3 includes the "vehicle-mounted screen 3" and/or the "video source 3". Therefore, it is indicated to pause playing of the video source 3 and turn off the vehicle-mounted screen 3. Because the vehicle-mounted screen 3 viewed by the passenger 3 is not shared with another passenger, and the video source 3 played on the vehicle-mounted screen 3 is not projected onto another vehicle-mounted screen, when attention of the passenger 3 is lost, turning off the vehicle-mounted screen 3 currently viewed by the passenger 3 does not affect video viewing of the passenger 1 and the passenger 2.

According to the method provided in this embodiment, the first attribute parameter set including a vehicle-mounted screen and a media stream viewed by the first passenger is established. When the attention of the first passenger is lost, through searching for the second attribute parameter set that is in the head unit and that has a common attribute parameter with the first attribute parameter set, it may be determined whether the vehicle-mounted screen or the media stream currently viewed by the first passenger is shared with another passenger. If the vehicle-mounted screen or the media stream is shared, the vehicle-mounted screen is correspondingly adjusted and the media stream continues to be played. Therefore, when the vehicle-mounted screen and the media stream are turned off, video experience of the another passenger is not affected.

In this method, an association relationship between attribute parameter sets having a same parameter is established, so that a relationship between the vehicle-mounted screen and the media stream played on the vehicle-mounted screen and another attribute parameter set may be considered when the media stream played on the vehicle-mounted screen needs to be adjusted currently. Further, before the vehicle-mounted screen and the media stream are turned off, an impact range of the vehicle-mounted screen and the media stream is comprehensively considered, so that control requirements of a plurality of users and a plurality of complex relationships can be met without affecting experience of another user who views a video.

In addition, when it is determined that attention of a passenger is lost, media stream information of the passenger is updated, including recording breakpoint information of the passenger, and monitoring status information of the passenger in real time, to provide information for subsequent attention returning.

Figure 5:
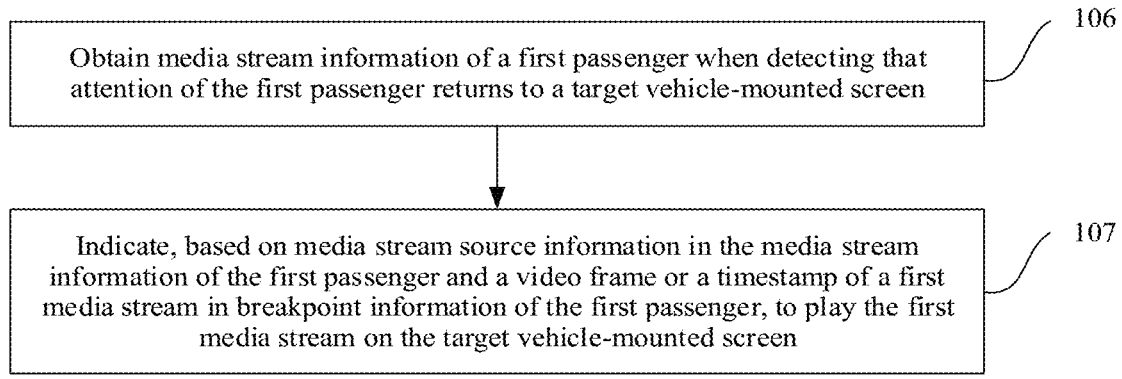
FIG. 5 is a flowchart of still another media stream playing method according to an embodiment of the present disclosure.

The following describes method steps when the attention of the passenger returns. When it is determined that the attention of the first passenger returns, a method for controlling a related vehicle-mounted screen and the media stream, as shown in FIG. 5, includes the following steps.

106: Obtain media stream information of the first passenger when it is determined that the attention of the first passenger returns to a target vehicle-mounted screen.

The target vehicle-mounted screen may be the first vehicle-mounted screen, or may be another vehicle-mounted screen in the vehicle, for example, the second vehicle-mounted screen or a third vehicle-mounted screen.

The media stream information of the first passenger includes the media stream source information and the breakpoint information of the first passenger. The media stream source information includes information for identifying the media stream, such as a title of a film/TV series and a music name/song name. The breakpoint information of the first passenger includes information such as the video frame or the timestamp of the first media stream played on the first vehicle-mounted screen when the attention of the first passenger is lost. The media stream information of the first passenger may be obtained from the head unit memory. For details, refer to the foregoing description of "step 104" or "step 105". For example, it is detected at a time t2 that the attention of the first passenger is lost, and the first media stream played on the first vehicle-mounted screen is an $N^{th}$ frame (frame N) of a complete video. Alternatively, at a time point, for example, a time t2 at which the first media stream is being played, if the video source 1 is played to the $8^{th}$ minute and $32^{nd}$ second of total duration of the program source, the timestamp is "$8^{th}$ minute and $32^{nd}$ second".

In addition, the head unit may determine, based on the status information of the first passenger reported by the sensor module, whether the attention of the first passenger returns to the target vehicle-mounted screen. If the head unit determines that the currently reported status information of the first passenger is "Yes", it is determined that the attention of the first passenger returns to the target vehicle-mounted screen.

107: Indicate, based on the media stream source information in the media stream information of the first passenger and the video frame or the timestamp of the first media stream in the breakpoint information of the first passenger, to play the first media stream on the target vehicle-mounted screen.

In an implementation, the head unit indicates the target vehicle-mounted screen to continue playing the first media stream from the video frame or the timestamp.

Alternatively, in another implementation, the first passenger is asked whether the first media stream needs to be played from the video frame or the timestamp recorded in the breakpoint information. If yes, the first media stream continues to be played from the video frame or the timestamp.

When the attention of the first passenger returns to the first vehicle-mounted screen, prompt bar information pops up on the first vehicle-mounted screen, to prompt the first passenger "whether to continue playing the video source 1". It should be understood that, if the attention of the first passenger returns to another vehicle-mounted screen, for example, the second vehicle-mounted screen, the prompt bar information pops up on the second vehicle-mounted screen, and the attribute parameter set of the first passenger is updated. If the head unit receives an indication signal triggered by the first passenger on the first vehicle-mounted screen, that is, receives an operation indicating "Yes", the head unit continues to play the first media stream from the video frame and the timestamp that are recorded in the breakpoint information of the first passenger. For example, in the scenario shown in FIG. 3A or FIG. 3B, when the attention of the passenger 1 returns to the vehicle-mounted screen 1 and the operation that the passenger 1 selects "Yes" is detected, the video source 1 is invoked from the media stream source information, and the video source 1 continues to be played from the video frame or timestamp of the passenger 1 recorded by the video source 1.

In addition, the method further includes: if a received indication is "No", that is, the first media stream is not continuously played from the breakpoint information of the first passenger, playing the first media stream from the start frame, or playing the first media stream based on the video frame selected by the first passenger, or returning to the home page.

According to the method provided in this embodiment, when the attention of the first passenger returns to a vehicle-mounted screen, the video frame or the timestamp at which the attention of the first passenger is lost can be found based on the recorded media stream information of the first passenger, and the media stream continues to be played at the video frame or the timestamp. Therefore, continuity of viewing the media stream by the first passenger is ensured, and viewing experience of the user is improved.

Optionally, there may be a plurality of pieces of media stream information of the first passenger. When there are a plurality of pieces of media stream information, all the media stream information may be presented to the first passenger, so that the first passenger selects one media stream to continue playing.

In another example, in the scenario shown in FIG. 3C or FIG. 3D, when the attention of the passenger 1 returns to the vehicle-mounted screen 1, because the vehicle-mounted screen 1 corresponding to the passenger 1 is shared with the passenger 2, that is, the passenger 2 keeps viewing the vehicle-mounted screen 1, the video source 1 continues to be played on the vehicle-mounted screen 1. In this case, although the attention of the passenger 1 returns, to ensure video viewing experience of the passenger 2, the vehicle-mounted screen 1 is still controlled to continue playing content of the video source 1, so that the video source 1 is not played from the breakpoint information of the passenger 1.

In addition, when it is determined that the attention of the first passenger is lost from the first vehicle-mounted screen, after the media stream information of the first passenger is updated, the method further includes: the head unit sends the media stream information of the first passenger to a first terminal device. The first terminal device is a terminal device that projects a screen onto the first vehicle-mounted screen, for example, a mobile phone of the first passenger. In this way, when the first passenger gets off and goes to another place, the first passenger may continue to view the first media stream by using the mobile phone. For example, when returning to home, the first passenger may continue to view the first media stream that has not been completely played on the first vehicle-mounted screen. This implements a seamless connection between a person, a vehicle, and home when the media stream is played.

Optionally, the mobile phone may further transmit the first media stream information to another device in another place, for example, a smart screen at home, to continue to view the first media stream on the another device.

According to the method provided in this embodiment, a vehicle-mounted sensor module is configured to establish an attribute parameter set of a passenger, and a state of the passenger viewing a vehicle-mounted screen is monitored in real time. Once it is detected that attention of the passenger is lost, breakpoint information of the passenger is recorded. In addition, when the attention of the passenger returns, breakpoint playing and backhaul services are provided for the passenger. In this way, smoothness and integrity of viewing a media stream by the passenger are ensured. In addition, the breakpoint information may be transmitted back to a mobile phone terminal of the passenger. This implements a seamless connection between a person, a vehicle, and home when the media stream is played, and improves viewing experience of the user.

Figure 6:
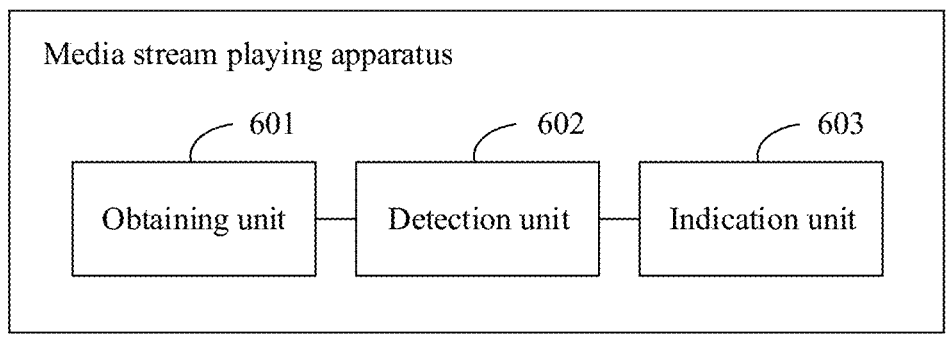
FIG. 6 is a schematic diagram of a structure of a media stream playing apparatus according to an embodiment of the present disclosure.

In addition, the method described in the foregoing embodiment of the present disclosure may implement a corresponding function by using a software module. As shown in FIG. 6, an embodiment further provides a media stream playing apparatus. The apparatus includes an obtaining unit 601, a detection unit 602, and an indication unit 603. In addition, the apparatus may further include other functional modules or units, such as an updating unit and a storing unit.

The obtaining unit 601 is configured to obtain a first attribute parameter set when detecting that a first passenger views a first media stream played on a first vehicle-mounted screen. The first attribute parameter set includes an identity of the first passenger and the first vehicle-mounted screen viewed by the first passenger. The detection unit 602 is configured to detect whether attention of the first passenger is lost from the first vehicle-mounted screen. The indication unit 603 is configured to: when the detection unit 602 determines that the attention of the first passenger is lost from the first vehicle-mounted screen, if it is determined that a second vehicle-mounted screen that is viewed by a second passenger and that is in a stored second attribute parameter set is the first vehicle-mounted screen, indicate to continue playing the first media stream on the first vehicle-mounted screen.

The indication unit 603 delivers a first instruction to the first vehicle-mounted screen, and the first vehicle-mounted screen continues to play the first media stream after receiving the first instruction.

The second attribute parameter set includes an identity of the second passenger and the second vehicle-mounted screen viewed by the second passenger. The second attribute parameter set is pre-stored in a storage unit, so as to be invoked by the obtaining unit 601.

In addition, optionally, in a possible implementation, when the detection unit 602 determines whether the attention of the first passenger is lost from the first vehicle-mounted screen, if it is determined that a second media stream played on the second vehicle-mounted screen that is viewed by the second passenger and that is in the stored second attribute parameter set is the first media stream, the indication unit 603 is configured to indicate to continue playing the first media stream on the second vehicle-mounted screen corresponding to the second attribute parameter set.

The second attribute parameter set includes the identity of the second passenger and the second media stream viewed by the second passenger.

Optionally, in an implementation, the obtaining unit 601 is further configured to obtain status information of the first passenger reported by a sensor module. The status information of the first passenger is used to indicate a state of the first passenger viewing a vehicle-mounted screen. The detection unit 602 is further configured to detect, based on the status information of the first passenger, whether the attention of the first passenger is lost from the first vehicle-mounted screen. The obtaining unit 601 stores the obtained status information of the first passenger in the storage unit. The detection unit 602 invokes the status information of the first passenger in the storage unit, to further detect whether the attention of the first passenger is lost.

Optionally, in a specific implementation, the updating unit is configured to update the media stream information of the first passenger when the detection unit 602 determines that the attention of the first passenger is lost from the first vehicle-mounted screen. The media stream information of the first passenger includes media stream source information and breakpoint information of the first passenger. The media stream source information is used to identify the first media stream. The breakpoint information of the first passenger includes a video frame or a timestamp of the first media stream played on the first vehicle-mounted screen when the attention of the first passenger is lost.

The updating unit determines, based on the status information of the first passenger in the storage unit, whether the attention of the first passenger is lost. If the status information of the first passenger is "Yes", it indicates that the first passenger views the vehicle-mounted screen and the attention is not lost. If the status information of the first passenger is "No", it indicates that the attention of the first passenger is lost.

Optionally, the updating unit stores the updated media stream information of the first passenger in the storage unit.

In addition, the obtaining unit 601 is further configured to obtain the media stream information of the first passenger when the detection unit 602 determines that the attention of the first passenger returns to a target vehicle-mounted screen. The media stream information of the first passenger includes breakpoint information of the first passenger. The breakpoint information of the first passenger includes a video frame or a timestamp of the first media stream played on the first vehicle-mounted screen when the attention of the first passenger is lost. The indication unit 603 is further configured to indicate, based on the media stream source information in the media stream information of the first passenger and the video frame or the timestamp of the first media stream in the breakpoint information of the first passenger, to continue playing the first media stream on the target vehicle-mounted screen.

The media stream information of the first passenger may be pre-stored in the storage unit, so that the obtaining unit 601 obtains the media stream information.

Optionally, in another specific implementation, the indication unit 603 is further configured to: when the detection unit 602 determines that the attention of the first passenger is lost from the first vehicle-mounted screen, indicate to send the media stream information of the first passenger to a terminal device of the first passenger, for example, a mobile phone, so that when the first passenger gets off and goes to another place, the first passenger may continue to view, by using the mobile phone, the first media stream from the video frame or the time stamp recorded in the breakpoint information.

When the detection unit 602 determines that the attention of the first passenger is lost, the indication unit 603 generates a second instruction, and sends the second instruction to a transceiver. After receiving the second instruction, the transceiver sends the media stream information of the first passenger obtained from the storage unit to the terminal device.

In addition, the indication unit 603 is further configured to: when the first passenger loses attention and the second attribute parameter set does not exist, indicate the first vehicle-mounted screen to pause playing of the first media stream, and turn off the first vehicle-mounted screen.

Alternatively, the detection unit 602 determines that the first media stream is being played on the second vehicle-mounted screen. The indication unit 603 indicates to continue playing the first media stream on the second vehicle-mounted screen, so that the first media stream viewed by a passenger on another vehicle-mounted screen is not affected, but may indicate to turn off the first vehicle-mounted screen.

Figure 7:
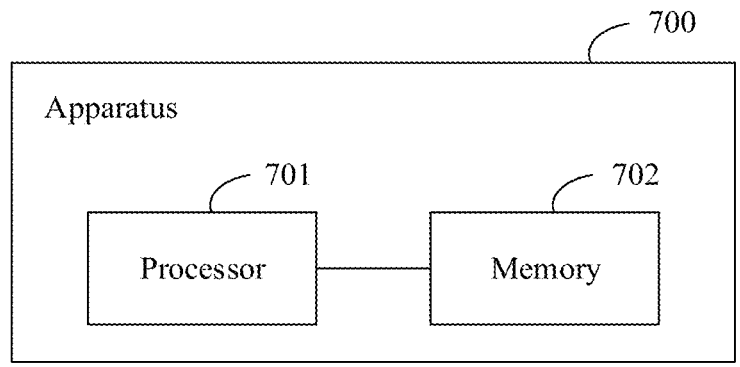
FIG. 7 is a schematic diagram of a structure of a hardware apparatus according to an embodiment of the present disclosure.

In addition, in specific implementation, an embodiment further provides a hardware apparatus. As shown in FIG. 7, the apparatus 700 includes a processor 701 and a memory 702, and the memory 702 is coupled to the processor 701. In addition, the apparatus 700 may further include other components such as a transceiver, an internal interface, an external interface, a sensor module, and a vehicle-mounted screen, as shown in FIG. 2.

The processor 701 is a control center of the apparatus, and may be connected to the apparatus by using various interfaces and lines. The processor may run or execute a software program stored in the memory 702 and invoke data stored in the memory 702, to implement the methods shown in FIG. 4A, FIG. 4B, and FIG. 5 in the foregoing embodiments.

The processor 701 is configured to: obtain a first attribute parameter set when it is determined that a first passenger views a first media stream played on a first vehicle-mounted screen; and when it is determined that attention of the first passenger is lost from the first vehicle-mounted screen, if it is determined that a second vehicle-mounted screen that is viewed by a second passenger and that is in a stored second attribute parameter set is the first vehicle-mounted screen, indicate to continue playing the first media stream on the first vehicle-mounted screen. The second attribute parameter set includes an identity of the second passenger and the second vehicle-mounted screen viewed by the second passenger.

Alternatively, the processor 701 is configured to: obtain a first attribute parameter set when detecting that a first passenger views a first media stream played on a first vehicle-mounted screen; and when it is determined that attention of the first passenger is lost from the first vehicle-mounted screen, if it is determined that a second media stream played on a second vehicle-mounted screen that is viewed by a second passenger and that is in a stored second attribute parameter set is the first media stream, indicate to continue playing the first media stream on the second vehicle-mounted screen corresponding to the second attribute parameter set. The second attribute parameter set includes an identity of the second passenger and the second media stream viewed by the second passenger.

In addition, the processor 701 may establish a connection to another device by using the internal interface and/or the external interface. For example, the processor 701 is further configured to periodically obtain, by using the external interface, status information of a passenger reported by the sensor module, for example, obtain status information of the first passenger, and stores the status information of the passenger in the memory 702 by using the internal interface.

Optionally, when the first passenger needs to be asked whether the first media stream needs to be played from a video frame or a time stamp recorded in breakpoint information, the processor 701 is further configured to indicate a target vehicle-mounted screen to display "prompt bar information", to prompt the first passenger whether to continue playing the first video source. After receiving an acknowledgment signal fed back by the first passenger, the processor controls the first vehicle-mounted screen to play the first media stream from the video frame or the time stamp.

The processor 701 may be connected to the target vehicle-mounted screen by using the internal interface, so that the processor 701 is further configured to control turn-on and turn-off of the target vehicle-mounted screen, play a media stream after turn-on, and the like. The target vehicle-mounted screen may be the first vehicle-mounted screen or another vehicle-mounted screen.

It should be understood that the processor 701 is further connected to another vehicle-mounted screen, to control turn-on and turn-off of each vehicle-mounted screen, and play a media stream after turn-on.

Optionally, when media stream information of the first passenger needs to be sent, the processor 701 is configured to send an instruction to the transceiver, to instruct the transceiver to send the media stream information of the first passenger to a terminal device of the first passenger.

Optionally, the processor 701 may include an integrated circuit (IC), for example, may include a single packaged IC, or may include a plurality of packaged ICs that are connected and that have a same function or different functions. For example, the vehicle-mounted controller 201 may include a central processing unit (CPU), a digital signal processor (DSP), or the like.

In addition, the processor 701 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 702 is configured to store computer program instructions or code. In addition, it may be further configured to store status information of all passengers, the first attribute parameter set, the second attribute parameter set, media stream source information of the first passenger, and the like.

Optionally, the memory 702 may include a volatile memory for example, a random-access memory (RAM), and may further include a non-volatile memory, for example, a flash memory, a hard disk drive (HDD), or a solid-state drive (SSD). The memory 702 may further include a combination of the foregoing types of memories.

All or some of the foregoing embodiments may be implemented by using software, hardware, firmware, or any combination thereof. When the software is used to implement the embodiments, all or some of the embodiments may be implemented in a form of a computer program product. For example, all functions of the obtaining unit 601, the detection unit 602, and the indication unit 603 in the video playing apparatus shown in FIG. 6 may be implemented by the processor 701, and a function of the storage unit may be implemented by the memory 702.

It should be noted that the hardware apparatus 700 in this embodiment has some or all functions of the head unit 20 or the motor vehicle shown in FIG. 2. The processor 701 and the memory 702 have all functions of the vehicle-mounted controller 201 and the memory 202 in the foregoing embodiments. In this way, the media stream playing method in the foregoing embodiment is implemented.

For example, the processor 701 and the memory 702 generate an attribute parameter set based on status information of a passenger reported by the sensor module, and control, by using the attribute parameter set, an attribute parameter such as a media stream or a vehicle-mounted screen included in the attribute parameter set. For a specific control method, refer to the description in the foregoing embodiment. Details are not described herein again.

In addition, optionally, the hardware apparatus 700 may alternatively be a processing chip or a processing circuit.

An embodiment of the present disclosure further provides a computer program product. The computer program product includes one or more computer program instructions. When a computer loads and executes the computer program instructions, all or some of the procedures or functions described in the foregoing method embodiments are generated. The computer may be a general-purpose computer, a dedicated computer, a computer network, or other programmable apparatuses.

The computer program instructions may be stored in a computer-readable storage medium, or may be transmitted from one computer-readable storage medium to another computer-readable storage medium. The storage medium may be the foregoing memory or storage unit.

For same or similar parts in the embodiments of this specification, refer to each other. Particularly, the embodiment of the video playing apparatus is basically similar to the method embodiment, and therefore is described briefly. For related parts, refer to descriptions in the method embodiment.

In addition, in the specification, claims, and accompanying drawings of the present disclosure, the terms "first", "second", and the like are intended to distinguish between similar objects but do not necessarily indicate a specific order or sequence. It should be understood that the data termed in such a way are interchangeable in appropriate circumstances, so that the embodiments described herein can be implemented in other orders than the order illustrated or described herein. Moreover, the terms "include", "contain" and any other variants mean to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The foregoing descriptions are implementations of the present disclosure, but are not intended to limit the protection scope of this application.

What is claimed is:

1. A method, wherein comprising:
   detecting that a first passenger of a vehicle views a first media stream played on a first vehicle-mounted screen of the vehicle;
   obtaining a first attribute parameter set in response to detecting that the first passenger views the first media stream played on the first vehicle-mounted screen, wherein the first attribute parameter set comprises a first identity of the first passenger and a second identity of the first vehicle-mounted screen;
   determining that attention of the first passenger is lost from the first vehicle-mounted screen;
   determining, in response to determining that the attention of the first passenger is lost from the first vehicle-mounted screen, that the first vehicle-mounted screen is viewed by a second passenger based on a second attribute parameter set, wherein the second attribute parameter set comprises a third identity of the second passenger and the second identity of the first vehicle-mounted screen; and
   indicating, in response to determining that the first vehicle-mounted screen is viewed by the second passenger, to continue playing the first media stream on the first vehicle-mounted screen.

2. The method of claim 1, wherein determining that the attention of the first passenger is lost from the first vehicle-mounted screen comprises:
   obtaining status information of the first passenger from a sensor module, wherein the status information indicates a state of the first passenger viewing the first vehicle-mounted screen; and
   determining, based on the status information, whether the attention of the first passenger is lost from the first vehicle-mounted screen.

3. The method of claim 1, further comprising updating media stream information of the first passenger in response to determining that the attention of the first passenger is lost from the first vehicle-mounted screen, wherein the media stream information comprises media stream source information and breakpoint information of the first passenger, and wherein the breakpoint information comprises a video frame or a timestamp of the first media stream played on the first vehicle-mounted screen when the attention of the first passenger is lost.

4. The method of claim 3, further comprising:
determining that the attention of the first passenger returns to a target vehicle-mounted screen;
obtaining, in response to determining that the attention of the first passenger returns to the target vehicle-mounted screen, the media stream information of the first passenger; and
indicating, based on the media stream source information in the media stream information of the first passenger and the video frame or the timestamp of the first media stream in the breakpoint information, to play the first media stream on the target vehicle-mounted screen.

5. The method of claim 3, further comprising indicating, in response to determining that the attention of the first passenger is lost from the first vehicle-mounted screen, to send updated media stream information of the first passenger to a terminal device of the first passenger.

6. A method, wherein comprising:
detecting that a first passenger of a vehicle views a first media stream played on a first vehicle-mounted screen of the vehicle;
obtaining a first attribute parameter set in response to detecting that the first passenger views the first media stream played on the first vehicle-mounted screen, wherein the first attribute parameter set comprises a first identity of the first passenger and a second identity of the first media stream;
determining that attention of the first passenger is lost from the first vehicle-mounted screen;
determining, in response to determining that the attention of the first passenger is lost from the first vehicle-mounted screen, that the first media stream is played on a second vehicle-mounted screen of the vehicle that is viewed by a second passenger based on a second attribute parameter set, wherein the second attribute parameter set comprises a third identity of the second passenger and the second identity of the first media stream; and
indicating, in response to determining that the first media stream is on the s vehicle-mounted screen and is viewed by the second passenger, to continue playing the first media stream on the second vehicle-mounted screen.

7. The method of claim 6, wherein determining that the attention of the first passenger is lost from the first vehicle-mounted screen comprises:
obtaining status information of the first passenger from a sensor module, wherein the status information indicates a state of the first passenger viewing the first vehicle-mounted screen; and
determining, based on the status information, whether the attention of the first passenger is lost from the first vehicle-mounted screen.

8. The method of claim 6, further comprising updating media stream information of the first passenger in response to determining that the attention of the first passenger is lost from the first vehicle-mounted screen, wherein the media stream information comprises media stream source information and breakpoint information, and wherein the breakpoint information comprises a video frame or a timestamp of the first media stream played on the first vehicle-mounted screen when the attention of the first passenger is lost.

9. The method of claim 8, further comprising:
when-determining that the attention of the first passenger returns to a target vehicle-mounted screen;
obtaining, in response to determining that the attention of the first passenger returns to the target vehicle-mounted screen, the media stream information of the first passenger; and
indicating, based on the media stream source information in the media stream information of the first passenger and the video frame or the timestamp of the first media stream in the breakpoint information, to play the first media stream on the target vehicle-mounted screen.

10. The method of claim 8, further comprising indicating, in response to determining that the attention of the first passenger is lost from the first vehicle-mounted screen, to send updated media stream information of the first passenger to a terminal device of the first passenger.

11. An apparatus comprising:
a memory configured to store instructions; and
a processor coupled to the memory and configured to execute the instructions to cause the apparatus to:
detect that a first passenger of a vehicle views a first media stream played on a first vehicle-mounted screen of the vehicle;
obtain a first attribute parameter set in response to detecting that the first passenger views the first media stream played on the first vehicle-mounted screen, wherein the first attribute parameter set comprises a first identity of the first passenger and a second identity of the first vehicle-mounted screen; and
determine that attention of the first passenger is lost from the first vehicle-mounted screen;
determine, in response to determining that the attention of the first passenger is lost from the first vehicle-mounted screen, that the first vehicle-mounted screen of the vehicle is viewed by a second passenger based on a second attribute parameter set, wherein the second attribute parameter set comprises a third identity of the second passenger and the second identity of the first vehicle-mounted screen; and
indicate, in response to determining that the first vehicle-mounted screen is viewed by the second passenger, to continue playing the first media stream on the first vehicle-mounted screen.

12. The apparatus of claim 11, wherein determining that the attention of the first passenger is lost from the first vehicle-mounted screen comprises:
obtaining status information of the first passenger from a sensor module, wherein the status information indicates a state of the first passenger viewing the first vehicle-mounted screen; and
determining, based on the status information, whether the attention of the first passenger is lost from the first vehicle-mounted screen.

13. The apparatus of claim 11 wherein the processor is further configured to execute the instructions to cause the apparatus to update media stream information of the first passenger in response to determining that the attention of the first passenger is lost from the first vehicle-mounted screen, wherein the media stream information comprises media stream source information and breakpoint information, and wherein the breakpoint information comprises a video frame or a timestamp of the first media stream played on the first vehicle-mounted screen when the attention of the first passenger is lost.

14. The apparatus of claim 13, wherein the processor is further configured to execute the instructions to cause the apparatus to:
- determine that the attention of the first passenger returns to a target vehicle-mounted screen;
- obtain, in response to determining that the attention of the first passenger returns to the target vehicle-mounted screen, the media stream information; and
- indicate, based on the media stream source information in the media stream information and the video frame or the timestamp of the first media stream in the breakpoint information, to play the first media stream on the target vehicle-mounted screen.

15. The apparatus of claim 14, wherein the processor is further configured to execute the instructions to cause the apparatus to indicate, in response to determining that the attention of the first passenger is lost from the first vehicle-mounted screen, to send updated media stream information of the first passenger to a terminal device of the first passenger.

16. An apparatus comprising:
- a memory configured to store instructions; and
- a processor coupled to the memory and configured to execute the instructions to cause apparatus to:
    - detect that a first passenger of a vehicle views a first media stream played on a first vehicle-mounted screen of the vehicle;
    - obtain a first attribute parameter set in response to detecting that the first passenger views the first media stream played on the first vehicle-mounted screen, wherein the first attribute parameter set comprises a first identity of the first passenger and a second identity of the first media stream;
    - determine that attention of the first passenger is lost from the first vehicle-mounted screen;
    - determine, in response to determining that the attention of the first passenger is lost from the first vehicle-mounted screen, that the first media stream is played on a second vehicle-mounted screen of the vehicle that is viewed by a second passenger based on a second attribute parameter set, wherein the second attribute parameter set comprises a third identity of the second passenger and the second identity of the first media stream; and
    - indicate, in response to determining that the first media stream is on the s vehicle-mounted screen and is viewed by the second passenger, to continue playing the first media stream on the second vehicle-mounted screen.

17. The apparatus of claim 16, wherein determining that the attention of the first passenger is lost from the first vehicle-mounted screen comprises:
- obtaining status information of the first passenger from a sensor, wherein the status information indicates a state of the first passenger viewing the first vehicle-mounted screen; and
- determining, based on the status information, whether the attention of the first passenger is lost from the first vehicle-mounted screen.

18. The apparatus of claim 16, wherein the processor is further configured to execute the instructions to cause the apparatus to update media stream information of the first passenger in response to determining that the attention of the first passenger is lost from the first vehicle-mounted screen, wherein the media stream information comprises media stream source information and breakpoint information, and wherein the breakpoint information comprises a video frame or a timestamp of the first media stream played on the first vehicle-mounted screen when the attention of the first passenger is lost.

19. The apparatus of claim 18, wherein the processor is further configured to execute the instructions to cause the apparatus to:
- determine that the attention of the first passenger returns to a target vehicle-mounted screen;
- obtain, in response to determining that the attention of the first passenger returns to the target vehicle-mounted screen, the media stream information; and
- indicate, based on the media stream source information in the media stream information and the video frame or the timestamp of the first media stream in the breakpoint information, to play the first media stream on the target vehicle-mounted screen.

20. The apparatus of claim 19, wherein the processor is further configured to execute the instructions to cause the apparatus to indicate, when in response to determining that the attention of the first passenger is lost from the first vehicle-mounted screen, to send updated media stream information of the first passenger to a terminal device of the first passenger.

* * * * *

UNITED STATES PATENT AND TRADEMARK OFFICE
CERTIFICATE OF CORRECTION

PATENT NO. : 11,956,492 B2
APPLICATION NO. : 18/147409
DATED : April 9, 2024
INVENTOR(S) : Qian Wu and Xiao Xiao It is certified that error appears in the above-identified patent and that said Letters Patent is hereby corrected as shown below:

On the Title Page

Page 2, (56) References Cited, U.S. Patent Documents: "2019/0086999 A1 3/2019 Rickn et al." should read "2019/0086999 A1 3/2019 Ricknas et al."

In the Claims

Claim 6, Column 23, Line 23: "method, wherein comprising:" should read "method comprising:"

Claim 9, Column 24, Line 2: "when-determining" should read "determining"

Signed and Sealed this
Fourteenth Day of May, 2024

Katherine Kelly Vidal
*Director of the United States Patent and Trademark Office*